J. J. REYNOLDS.
HOSE COUPLING.
APPLICATION FILED JUNE 13, 1918.
1,284,775.
Patented Nov. 12, 1918.
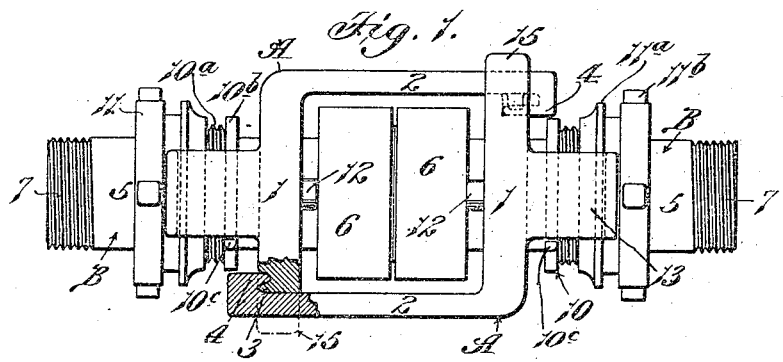
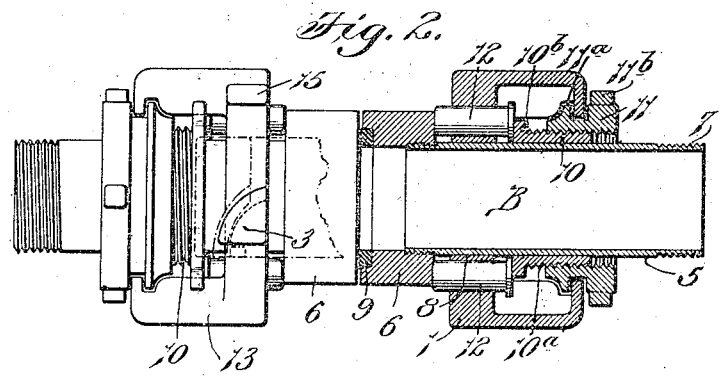
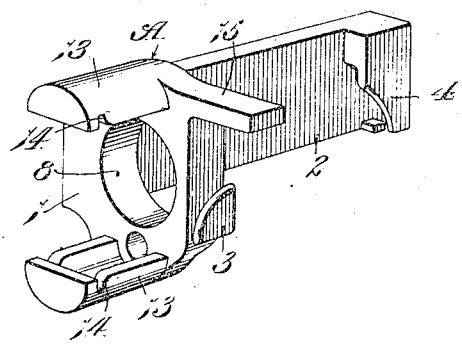
Inventor
James J. Reynolds.
By Bakewell & Cornwall
attys.

UNITED STATES PATENT OFFICE.

JAMES J. REYNOLDS, OF ST. LOUIS, MISSOURI.

HOSE-COUPLING.

1,284,775.

Specification of Letters Patent.  Patented Nov. 12, 1918.

Application filed June 13, 1918. Serial No. 239,751.

*To all whom it may concern:*

Be it known that I, JAMES J. REYNOLDS, a citizen of the United States, residing at St. Louis, Missouri, have invented a certain new and useful Improvement in Hose-Couplings, of which the following is a full, clear, and exact description, such as will enable others skilled in the art to which it appertains to make and use the same.

This invention relates to hose couplings of the kind that are used on railway cars for connecting together the hose extensions on the steam or air pipes of adjacent cars.

One object of my invention is to provide a hose coupling of the general character referred to that can be coupled and uncoupled easily and which is so constructed that the coöperating tubular members of same which communicate with the hose extensions are locked so securely together that a tight joint between said members is assured.

Another object is to provide a practicable hose coupling of simple design whose coöperating parts are so constructed and arranged that the coupling can be successfully used with short hose extensions, owing to the fact that the jaw members and the tubular members of the coupling can be engaged and disengaged by a slight movement longitudinally of the axis of the coupling. Other objects and desirable features of my invention will be hereinafter pointed out.

Figure 1 of the drawings is a top plan view of a hose coupling constructed in accordance with my invention.

Fig. 2 is a side elevational view of said coupling, partly in vertical section; and Fig. 3 is a perspective view of one of the jaw members.

The coupling, briefly described, consists of two jaw members provided with coöperating interlocking portions, tubular members on said jaw members arranged in longitudinal alinement with each other and communicating with the hose extensions which the coupling connects together and means of novel construction for drawing said jaw members into locking engagement with each other and for forcing said tubular members together so as to produce a tight joint between the abutting faces on the inner ends of said tubular members.

Referring to the drawings which illustrate the preferred form of my invention, A designates two jaw members and B designates two tubular members loosely mounted in said jaw members and adapted to be connected to the hose extensions on adjacent railway cars. Each of the jaw members A consists of a casting that comprises a body portion 1 arranged transversely of the coupling and a side portion 2 arranged longitudinally of the coupling. The two jaw members of the coupling are adapted to be arranged in the position shown in Fig. 1, namely, with the two body portions 1 spaced apart and with the side portions 2 arranged on opposite sides of the longitudinal axis of the coupling, the side portion 2 on one jaw member projecting forwardly and the side portion of the other jaw member projecting rearwardly. Each jaw member is provided with two jaws 3 and 4 arranged on the body portion 1 and on the outer end of the side portion 2, respectively, as shown in Fig. 3.

When said jaw members are arranged in operative engagement with each other the jaw 4 on the side portion of one member will engage the jaw 3 on the body portion of the other member, and the jaw 3 on the body portion of the member first referred to will engage the jaw 4 on the side portion of the other member. The two tubular members B of the coupling are of the same shape and construction and each consists of a tubular portion 5 provided at its inner end with a head 6 and at its outer end with an externally screw-threaded portion 7. Said tubular shaped members are reciprocatingly mounted in holes 8 formed in the body portions 1 of the jaw members and the meeting faces of the heads 6 on said tubular members are recessed so as to receive a gasket 9 that forms a tight joint between the heads 6 on the tubular members B when said members are forced toward each other.

The feature of my improved coupling which I believe to be novel is the means used for drawing the jaws on the jaw members A into engagement with each other and for forcing the heads on the tubular members B toward each other. Said means consists of sleeves 10 slidingly mounted on the tubular portions 5 of the members B and provided with external screw threads $10^a$, nuts 11 rotatably mounted on said sleeves and journaled in the jaw members A, and plungers 12 reciprocatingly mounted in the jaw members A and arranged between the heads 6 on the tubular members and flanges $10^b$ on the sleeves 10. The jaw member A of each half or part of the coupling is provided with a pair of arms 13 having transversely-disposed grooves 14 formed in the inner sides of same that receives a flange or annular rib 11ᵃ on the nut 11 which coöperates with said jaw member, thereby preventing said nut from moving longitudinally with relation to the jaw member when said nut is rotated on the sleeve 10 with which it coöperates. The sleeves 10 are mounted on the members B in such a manner that they can move freely longitudinally of the coupling, but cannot turn or rotate relatively to the jaw members A. This can be effected in various ways without departing from the spirit of my invention, but I prefer to provide each of the sleeves 10 with wings or lugs 10ᶜ that bear against the arms 13 on the jaw member with which said sleeve coöperates, as shown in Fig. 2.

To connect the two parts or halves of the coupling together one of the jaw members A is first moved laterally toward the other jaw member and then moved longitudinally slightly so as to cause the coöperating jaws on said members to engage each other, thus temporarily connecting the members A and also positioning the tubular members B in longitudinal alinement with each other. Thereafter, the nuts 11 are turned so as to move the tubular members B inwardly into engagement with each other and also move the jaw members A outwardly so as to cause the coöperating jaws 3 and 4 on same to be drawn into snug engagement with each other. To release or uncouple the coupling it is only necessary to turn the nuts 11 in the reverse direction so as to relieve the clamping pressure on the jaw members and on the tubular members, and thus permit the two parts or halves of the coupling to be separated. The nuts 11 can be provided with lugs 11ᵇ, so as to facilitate turning said nuts, and the body portion 1 of each jaw member can be provided with a laterally-projecting arm 15 arranged in vertical alinement with the jaw 3 on said body portion, as shown in Fig. 3. The purpose of providing the jaw member with a laterally-projecting arm 15, arranged above the jaw 3, is to enable said jaw member to be coupled to a coupling member that is not equipped with jaws of the same design as the jaws 3 and 4 herein shown. When used in the manner above referred to, namely, in conjunction with a coupling member not provided with coöperating jaws that hold the two members in the same horizontal plane, the arm 15 on the jaw member of my improved coupling projects laterally over the jaw member on the other half of the coupling, and thus prevents the jaw member of my improved coupling from dropping downwardly relatively to the other jaw member.

A coupling of the construction above described insures an absolutely tight joint between the coöperating tubular members B of same, owing to the fact that the heads 6 on said members are forced toward each other by the endwise pressure which the plungers 12 exert on said heads when the nuts 11 are turned in one direction; it can be coupled and uncoupled quickly and easily, owing to the fact that the operation of turning the nuts 11 in one direction moves the tubular members B inwardly toward each other and after said members have engaged each other causes the jaw members A to be drawn into snug engagement with each other; it is composed of only a few parts of simple design, and consequently, can be manufactured cheaply, and it can be used successfully with short hose extensions, owing to the fact that the jaw members and tubular members are so constructed and arranged that they can be engaged and disengaged by a slight longitudinal movement.

Having thus described my invention, what I claim, and desire to secure by Letters Patent, is:

1. A hose coupling, comprising jaw members provided with interlocking portions, tubular members reciprocatingly mounted in said jaw members in longitudinal alinement with each other, nuts journaled in said jaw members, and devices reciprocatingly mounted in said jaw members and adapted to be moved longitudinally by said nuts for causing the tubular members to move inwardly into engagement with each other and the jaw members to thereafter move into intimate interlocking engagement with each other when said nuts are turned in one direction.

2. A hose coupling, comprising jaw members provided with coöperating interlocking portions, tubular members reciprocatingly mounted in said jaw members and arranged in longitudinal alinement with each other, sleeves reciprocatingly mounted on said tubular members and guided longitudinally in said jaw members for moving said tubular members inwardly, and nuts journaled in said jaw members and combined with said sleeves in such a manner that the operation of turning said nuts in one direction causes the tubular members to be forced into engagement with each other and the jaw members to be thereafter moved into intimate interlocking engagement with each other.

3. A hose coupling, comprising a jaw member, a tubular member reciprocatingly mounted in said jaw member and provided at its inner end with a head which is recessed to receive a gasket, a sleeve surrounding said tubular member and reciprocatingly mounted on said jaw member, a nut mounted on external screw threads on said sleeve and journaled in said jaw member so as to cause said sleeve and tubular member to move longitudinally of the jaw member when said nut is turned in one direction, and a device on said jaw member that is adapted to coöperate with the other jaw member of the coupling to prevent one jaw member from dropping downwardly with relation to the other.

4. A hose coupling, comprising jaw members provided with interlocking portions, tubular members reciprocatingly mounted in said jaw members in longitudinal alinement with each other, plungers on said jaw members for engaging said tubular members and moving them longitudinally so as to cause the inner ends of same to butt together, sleeves reciprocatingly mounted on said tubular members for actuating said plungers, and nuts rotatably mounted on external screw threads on said sleeves and journaled in said jaw members; for the purpose described.

5. A hose coupling, each part or half of which comprises a jaw member, a tubular member reciprocatingly mounted in said jaw member and provided at its inner end with a head, a sleeve loosely mounted on said tubular member and provided with external screw threads and with portions that coöperate with said jaw member to prevent the sleeve from turning, and a nut threaded on said sleeve and journaled in said jaw member.

6. A hose coupling, comprising a jaw member, a tubular member reciprocatingly mounted in said jaw member, arms on said jaw member that extend longitudinally of said tubular member, a sleeve reciprocatingly mounted on said tubular member and provided with external screw threads, a nut rotatably mounted on said threads and provided with an annular rib or flange that projects into grooves formed in said arms, means for preventing said sleeve from turning relatively to the jaw member, and plungers in said jaw member arranged between a flange on said sleeve and a head on the inner end of said tubular member.

JAMES J. REYNOLDS.

Copies of this patent may be obtained for five cents each, by addressing the "Commissioner of Patents, Washington, D. C."